US009843610B2

(12) United States Patent
Mahajan et al.

(10) Patent No.: US 9,843,610 B2
(45) Date of Patent: Dec. 12, 2017

(54) SOCIAL NETWORKING AND VIRTUAL FRIENDS FOR WEARABLE DEVICES

(71) Applicant: Verizon Patent and Licensing Inc., Arlington, VA (US)

(72) Inventors: Amit Mahajan, Basking Ridge, NJ (US); Vijay K. Paulrajan, Basking Ridge, NJ (US); Farook Kaleem, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 266 days.

(21) Appl. No.: 14/726,352

(22) Filed: May 29, 2015

(65) Prior Publication Data
US 2016/0352789 A1 Dec. 1, 2016

(51) Int. Cl.
*G06F 15/16* (2006.01)
*H04L 29/06* (2006.01)
*H04W 4/20* (2009.01)
*H04L 29/08* (2006.01)

(52) U.S. Cl.
CPC ............ *H04L 65/403* (2013.01); *H04L 67/28* (2013.01); *H04W 4/206* (2013.01)

(58) Field of Classification Search
CPC ...... H04L 65/403; H04L 67/141; H04L 67/18
USPC ................................ 709/204, 200, 217, 203
See application file for complete search history.

(56) References Cited

U.S. PATENT DOCUMENTS

| 9,408,048 | B1* | 8/2016 | Paulrajan | H04W 4/12 |
| 2006/0208878 | A1* | 9/2006 | Nowlan | G08B 21/0258 340/539.13 |
| 2010/0267361 | A1* | 10/2010 | Sullivan | G01S 19/17 455/404.2 |
| 2011/0234397 | A1* | 9/2011 | Fetzer | G08B 21/0261 340/539.13 |
| 2013/0109342 | A1* | 5/2013 | Welch | B60N 2/002 455/404.2 |
| 2015/0245164 | A1* | 8/2015 | Merrill | H04W 4/06 370/329 |

OTHER PUBLICATIONS

LG Electronics MobileComm U.S.A., Inc., "GizmoPal User Guide,". Available at http://s7.vzw.com/is/content/VerizonWireless/Devices/LG/LG%20GizmoPal/UserGuides/smart-lg-gizmopal-ug.pdf, visited May 29, 2015.

* cited by examiner

Primary Examiner — El Hadji Sall

(57) ABSTRACT

Techniques described herein may be used to provide wearable devices (e.g., a watch, a clip on device, etc.) for children with virtual friend and social networking services. A virtual friend may include an animal, a cartoon character, or another personality with which the child may interact by talking, asking questions, receiving status updates, etc. Social networking services may be provided so that the child may interact with other children in a social networking environment. The virtual friend and social networking services may be controlled and managed by a parent's smart phone or other handheld device. A parent may place limits on when the virtual friend is available and/or when the child may access the social network. The parent may also have other controls, such as who the child can connect with and contact in the social networking environment.

20 Claims, 10 Drawing Sheets

SOCIAL NETWORKING AND VIRTUAL FRIENDS FOR WEARABLE DEVICES

BACKGROUND

Wearable devices (e.g., glasses and watches with wireless telecommunication capabilities) are becoming increasing available to children. For instance, one such device may enable a child to call pre-approved telephone numbers and enable a parent to monitor the geographical location of the child. However, currently available wearable devices do not provide adequate solutions for creating social networks or services like providing virtual friends that can assist and provide company to children.

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

Techniques described herein may be used to provide wearable devices (e.g., a watch, a clip on device, etc.) with virtual friend and social networking services. The wearable devices may be particularly useable by children. An example of a virtual friend may include an animal, a cartoon character, or another personality with which the child may interact by talking, asking questions, receiving status updates, etc. Social networking services may be provided so that the child may interact with other children in a social networking environment (e.g., by posting pictures, videos, comments, status updates, etc.). The virtual friend and social networking services may be controlled and managed by a parent's smart phone or other handheld device (referred to herein as a parent device). For instance, a parent may place limits (e.g., days, times, geographic restrictions, etc.) on when the virtual friend is available and/or when the child may access the social network. The parent may also have other controls, such as who the child can connect with and contact in the social networking environment. As such, the techniques described herein provide a virtual friend and social networking services to children in a safe and well-managed way.

Figure 1:
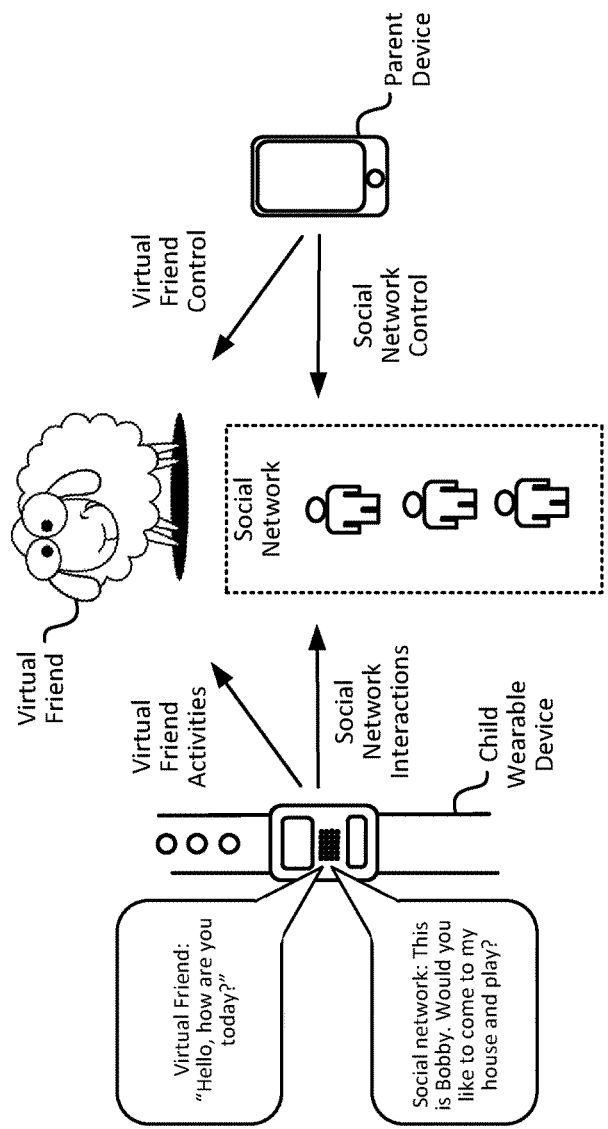
FIG. 1 illustrates an example overview of an implementation described herein.

FIG. 1 illustrates an example overview of an implementation described herein. As shown in FIG. 1, a parent device (e.g., a smart phone operated by a parent of a child wearing a child wearable device) may be capable of setting up and managing a virtual friend and a social network on the child wearable device. In FIG. 1, the virtual friend is shown as a cartoon sheep. The child wearable device may include interface components (e.g., a screen, a speaker, a button, etc.) that enables the child to speak and interact with the virtual friend. The parent device may control days, times, and geographical locations when the virtual friend is accessible by the child. For instance, the virtual friend may only be accessible while the child is at home between the hours of 3:00 PM and 5:00 PM. In some implementations, the child wearable device may include multiple virtual friends, each with their own appearance, behavior, settings, and other characteristics. Additionally, a virtual friend may provide tutoring services, such as an ability to answer academic questions from the child or assist the child with a school project or homework.

The parent device may also set up and manage a social network that is accessible by the child via the child wearable device. The parent device may send invitations to connect via the social network to other parent devices, and the parents of the parent devices can accept or reject the invitations. When an invitation is accepted, a digital profile associated with the child wearable device may then be logically connected to the digital profile of the other child wearable devices, and the child can begin interacting with other children in a social networking environment. As such, parent devices may be used to create, manage, and control virtual friends and social networks made accessible to children via wearable electronic devices. In addition to social networking services and virtual friend services, the child wearable device may provide other types of services as well, such as a list of preapproved telephone numbers (e.g., of friends, family, and emergency personnel) that the child may contact.

Figure 2:
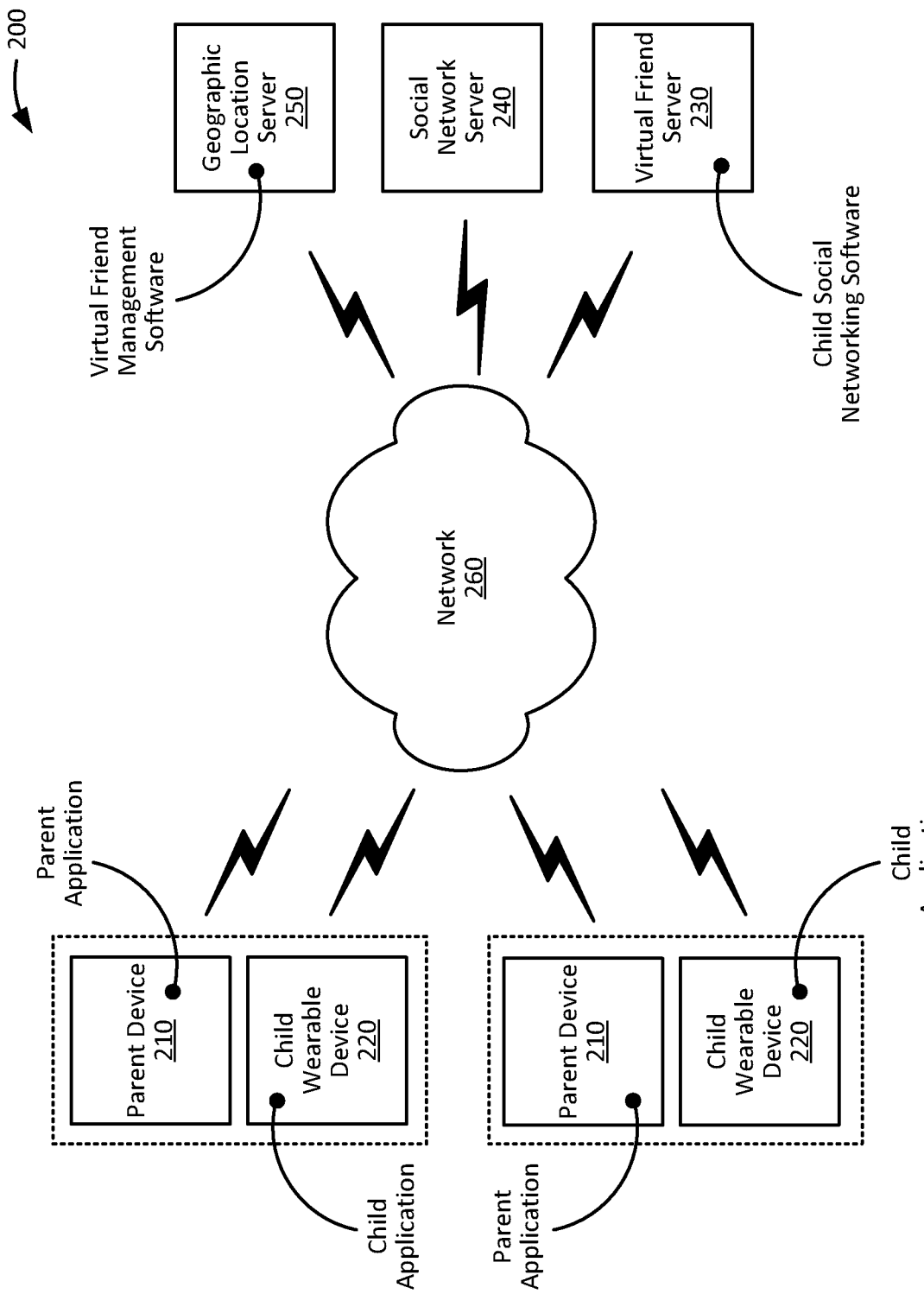
FIG. 2 is a diagram of an example environment in which systems and/or methods described herein may be implemented.

FIG. 2 is a diagram of an example environment 200 in which systems and/or methods described herein may be implemented. Environment 200 may include parent devices 210, child wearable devices 220, virtual friend server 230, social network server 240, geographic location server 250, and network 260. Each parent device 210 may be logically associated with a child wearable device 220 via a parent application installed on parent device 210 and a corresponding child application installed on child wearable device 220. The logical association of parent device 210 to child wearable device 220 may arise from a registration process that may be performed using the parent application and/or the child application.

Parent device 210 may include a portable computing and communication device, such as a personal digital assistant (PDA), a smart phone, a cellular phone, a laptop computer with connectivity to a wireless telecommunications network, a tablet computer, etc. Parent device 210 may connect, through a radio link, to network 260. Parent device 210 may include a software application that enables parent device 210 to setup and manage virtual friend services and social networking services for child wearable device 220. In some implementations, parent device 210 may communicate with virtual friend server 230 to enable and manage virtual friend services on child wearable device 220. Similarly, parent device 210 may communicate with social network server 240 to enable and manage social networking services on child wearable device 220.

Child wearable device 220 may include a portable computing and communication device that can be worn by a child and that can communicate via a wireless telecommunications network. As mentioned above, child wearable device 220 may include a watch or clip on device; however, child wearable device 220 could alternatively be a necklace, a ring, glasses, an ear piece, etc. In some implementations, child wearable device 220 may include one or more buttons, a screen, a speaker, a vibration device, or other features that enable a child to interact with the device. Child wearable device 220 may also include a software application that enables virtual friend services and/or social networking services. In some implementations, child wearable device 220 may include global positioning system (GPS) capabilities or another type of geographic positioning capability.

In some implementations, a virtual friend of child wearable device 220 may be capable of answering academic questions that a child may have or assisting the child with a school project or homework. For instance, the child may interact with the virtual friend in order to complete the school assignment (e.g., get help and answers to math, history, and science questions). In some implementations, this may be achieved by enabling a school server to communicate with virtual friend server 230, and virtual friend server 230 communicating with child wearable device 220.

Virtual friend server 230 may include one or more computation and communication devices that act to provide virtual friend services to parenting device 210 and child wearable device 220. For example, virtual friend server 230 may include a catalog of virtual friends, along with personality traits, voices, appearance, demeanors, etc., that a parent may select in order to define a virtual friend. Virtual friend server 230 may communicate the virtual friend to child wearable device 220 so that the child may begin interacting with the virtual friend. In some implementations, virtual friend server 230 may also include a variety of settings from which a parent may choose in order to control and manage the virtual friend (e.g., the days, times, and geographical locations where the virtual friend is available to the child via child wearable device 220).

Social network server 240 may include one or more computation and communication devices that act to provide social networking services to parenting device 210 and child wearable device 220. For example, social network server 240 may include information and profiles of parents and children that have registered for the social networking service. In some implementations, the social networking service may include a standalone or proprietary service. In some implementations, the social networking service may include services and information that are imported from existing social networking services (e.g., Facebook, Instagram, Twitter, etc.). Social network server 240 may include settings and controls that enable parents to manage the social network of a child. For instance, social network server 240 may enable a parent to view invitations to connect with a child and an ability to accept, decline, or ignore the invitations. As another example, social network server 240 may enable a parent to view the child's social network friends, block certain types of content, prohibit certain types of communication mediums (e.g., instant messaging), and remove friends from the child's social network.

Geographic location server 250 may include one or more computation and communication devices that act to determine the geographic location of child wearable device 220. Geographic location server 250 may communicate the geographic location of child wearable device 220 to virtual friend server 230 and social network server 240, which may enable virtual friend server 230 and social network server 240 to provide services based on the geographic location of child wearable device 220. For instance, if the parent of a child has specified that a child's virtual friend is unavailable while the child is in school, then geographic location server 250, in combination with virtual friend server 230, may monitor the child's location and enable/disable the virtual friend services of child wearable device 220 accordingly.

Network 260 may include one or more wired and/or wireless networks. For example, network 260 may include a cellular network (e.g., a second generation (2G) network, a third generation (3G) network, a fourth generation (4G) network, a fifth generation (5G) network, a LTE network, a GSM network, a code division multiple access (CDMA) network, an evolution-data optimized (EVDO) network, or the like), a public land mobile network (PLMN), and/or another network. Additionally, or alternatively, network 260 may include a local area network (LAN), a wireless LAN (WLAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

Figure 3:
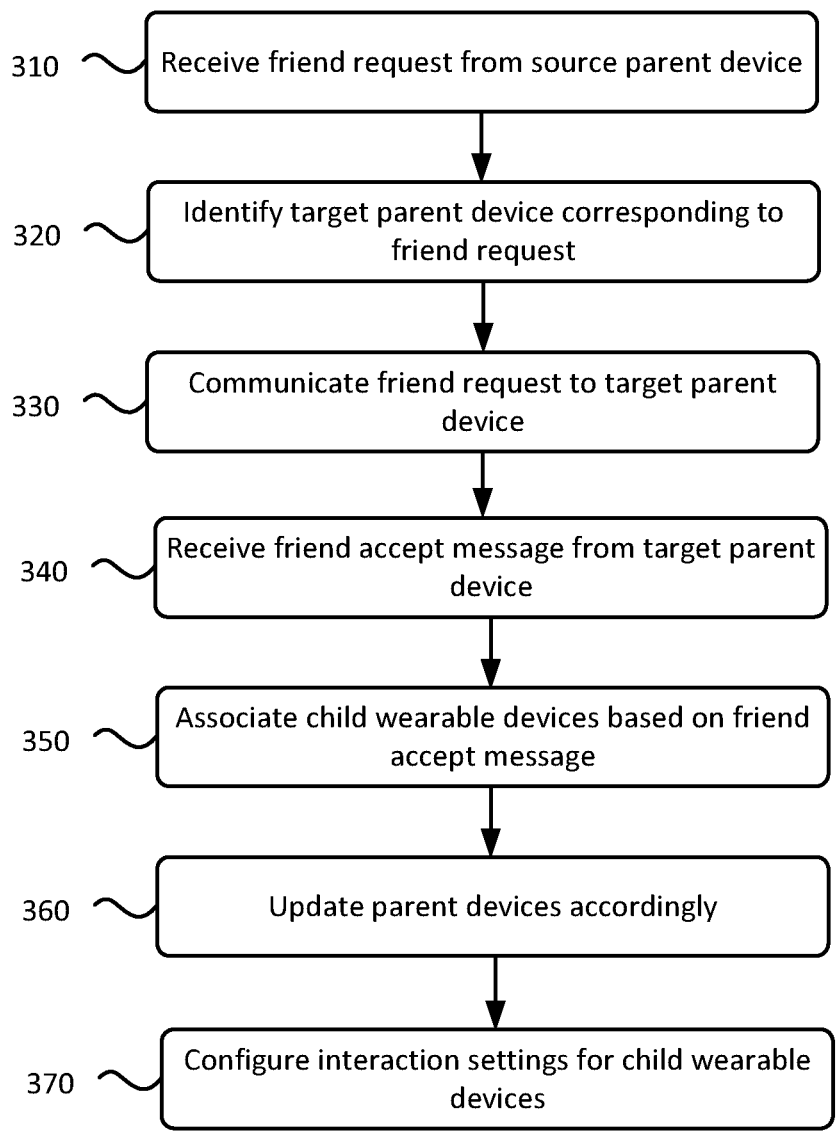
FIG. 3 is a flow chart illustrating an example process for creating a social network.

FIG. 3 is a flow chart illustrating an example process 300 for creating a social network. Process 300 may be implemented by social network server 240.

As shown, process 300 may include receiving a friend request from a source parent device (block 310). As used herein, a source parent device 210 may include a parent device 210 that is attempting to initiate a social network connection between child wearable devices 220. By contrast, a target parent device 210 may include a parent device 210 to which the source parent device 210 is directing an invitation (via social network sever 240) to have the child wearable devices 220 connect. The friend request may include identification information of the source parent device 210, the target parent device 210, and the child wearable devices 220 that will become connected via the social network.

In some implementations, a parent sending a friend request to a parent device 210 of another parent may do so by already knowing the contact information (e.g., the MDN) of the parent device 210. However, in other implementations, a parent may use parent device 210 to query for child wearable devices 220 and/or parent devices 210 with software for accessing the social network. The query may be directed to parent devices 210 and/or child wearable devices in a particular geographic area or directed to another type of characteristic, such as devices associated with a school, a neighborhood, a social club, etc.

Process 300 may include identifying a target parent device 210 corresponding to the friend request (320). For example, the friend request from the source parent device 210 may include a MDN of the target parent device 210, and social network server 240 may identify a target parent device 210 based on the MDN. In some implementations, social network server 240 may identify the target parent device 210 in another way, such as a name, a username, etc.

Process 300 may include communicating the friend request to the target parent device 210 (block 330). For instance, social network server 240 may forward the friend request received from the source parent device 210 to the target parent device 240. In some implementations, the friend request may include information (e.g., an MDN) identifying the source parent device 210 and information identifying the child wearable devices 220 for which a social network connection is being requested.

Process 300 may include receiving a friend accept message from the target parent device 240 (block 340). For example, the friend request sent to the target parent device 210 may be accepted, and a notification of the accepted friend request may be sent from the target parent device 210 to social network server 240.

Process 300 may include associating child wearable devices 220 in response to the friend accept message (block 350). For instance, social network server 240 may establish a logical connection between child wearable devices 220 that correspond to the friend request and/or the friend accept message. In some implementations, social network server 240 may communicate a notification to the child wearable devices 220 regarding the newly established connection. In some implementations, social network server 240 may communicate a notification, to the child wearable devices 220, which must be accepted by each child in order to establish the connection between the child wearable devices 220.

Process 300 may include updating parent devices 210 (block 360). For example, social network server 240 may confirm to the source parent device 210 and the target parent device 210 that the connection between child wearable devices 220 has been created. In some implementations, notifying parent devices 210 that the connection has been created may enable the parents of parent devices 210 to stay informed as to individuals that are connected to their children via the social network.

Process 300 may include configuring interaction settings for child wearable devices 220 (block 370). For example, social network server 240 may receive settings information, from the source parent device 210 and the target parent device 210 about how child wearable devices 220 can interact with one another via the social network. Examples of such settings information may include days, times, and durations for which a child may use the social network, and types of content or forms of communication that are enabled for each child wearable device 220.

Figure 4:
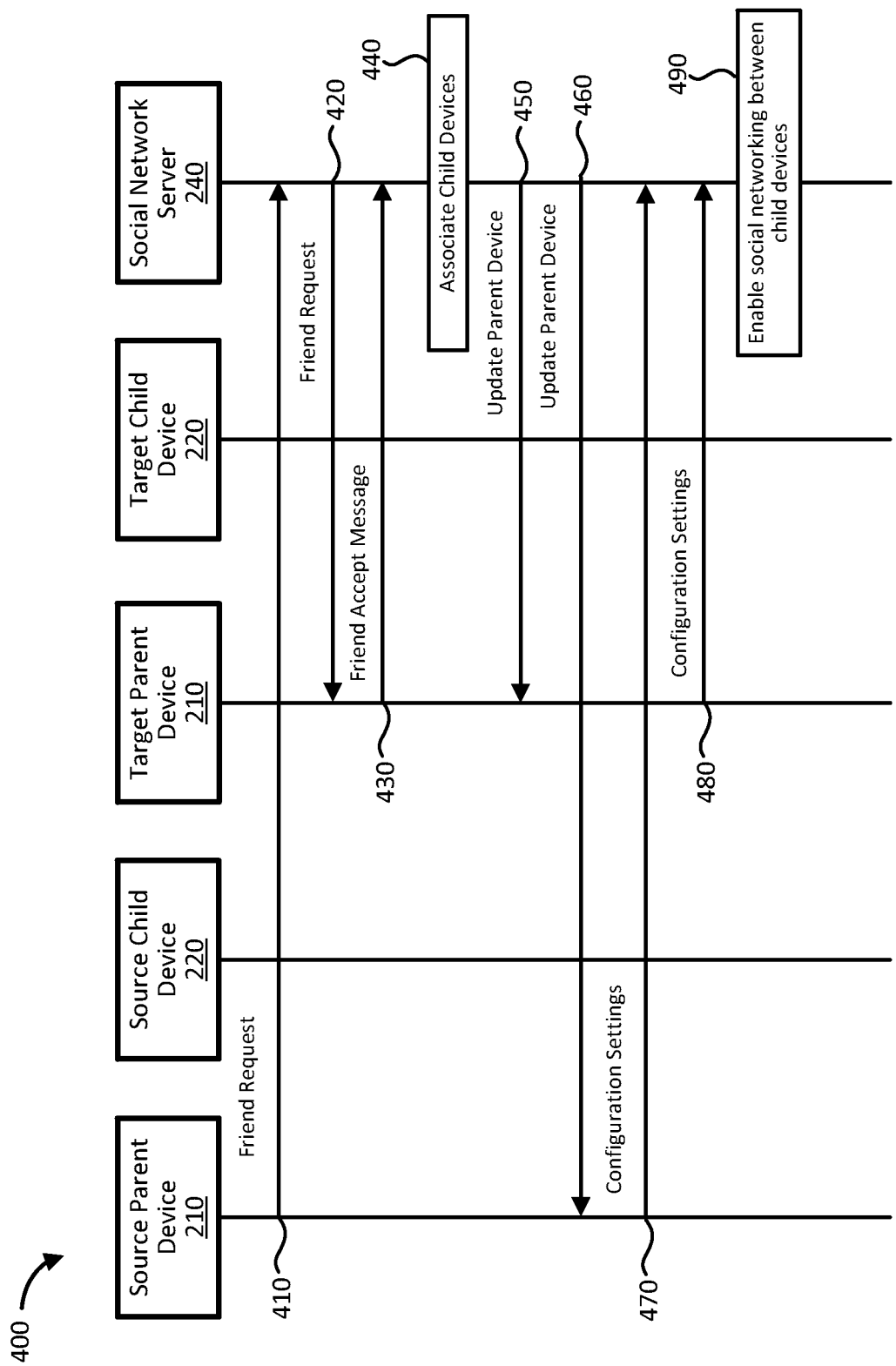
FIG. 4 is a sequence flow diagram illustrating an example process for creating a social network.

FIG. 4 is a sequence flow diagram illustrating an example process 400 for creating a social network. As shown, process 400 may include source parent device 210, source child device 220, source child device 220, target parent device 210, target child device 220, and social network server 240. Source parent device 210 may be an example of a parent device 210 that is initiating a social network connection between source child device 220 and target child device 220. Source child device 220 and target child device 220 are examples of child wearable device 220. Additionally, source parent device 210 and source child device 220, and target parent device 210 and target child device 220, may each correspond to a parent and corresponding child.

Source parent device 210 may communicate a friend request to social network server 240 (line 410). The friend request may include identification information for target parent device 210, source child device 220, and target child device 220. Social network server 240 may forward the friend request to target parent device 210 (line 420). Target parent device 210 may notify the user (e.g., the parent) of target parent device 210 that a friend request is pending and indicate the source of the friend request and the child devices 220 involved. The parent of target parent device 210 may accept the friend request, which may cause target parent device 210 to communicate a friend accept message to social network server 240 (line 430). The target parent device 210 may accept the friend request by automatically signing in to social network server 240 and accepting the friend request presented in a website hosted by social network server 240. In some implementations, the target parent device 210 may respond to the friend request and sign into the social network server 240 using the MDN of target child device 220.

Social network server 240 may create a logical association or connection between source child device 220 and target child device 220 in response to the friend accept message from target parent device 210 (block 440). Social network server 240 may provide an update to target parent device (line 450) and source parent device 210 (line 460). The update may indicate that source child device 220 and target child device 220 are now able to follow and/or communicate with one another via the social network. Source parent device 210 and target parent device may provide social network server with configuration settings regarding the control and management of the interactions between source child device 220 and target child device (lines 470 and 480). The configuration settings may include rules and instructions regarding when and how source child device 220 and target child device 220 may interact with one another and access the social network service. With a logical association between source child device 220 and target child device 220, along with configuration settings from source parent device 210 and target parent device 210, social network server 240 may enable social networking services for source child device 220 and target child device 220 (block 490).

Figure 5:
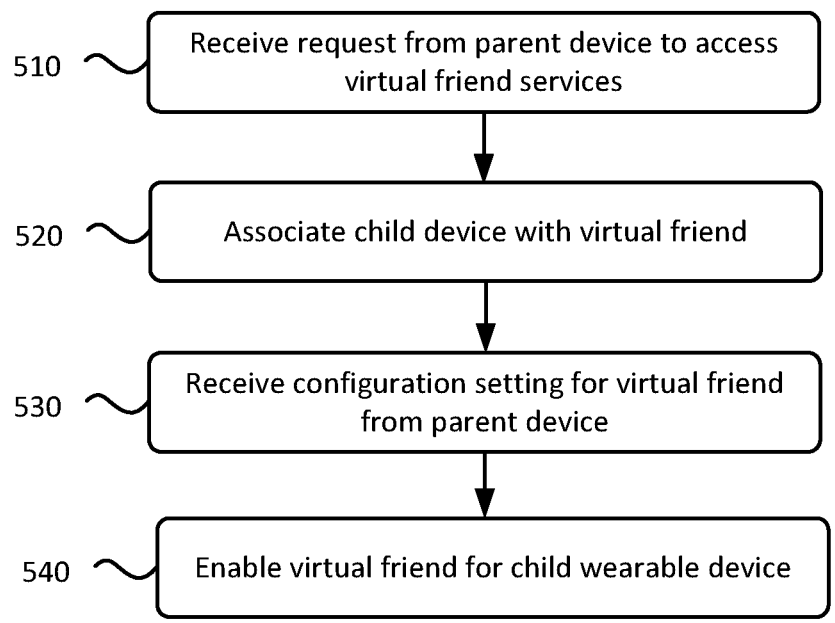
FIG. 5 is a flow chart illustrating an example process for providing a virtual friend.

FIG. 5 is a flow chart illustrating an example process 500 for providing a virtual friend. Process 500 may be implemented by virtual friend server 230.

As shown, process 500 may include receiving a request from parent device 210 to access virtual friend services (block 510). For example, parent device 210 may contact virtual friend server 230 in order to access a menu of virtual friends and virtual friend attributes and traits. In some implementations, the virtual friends may be organized according to type (e.g., animals, cartoon characters, etc.) and the traits of each virtual friend may include characteristics such as appearance, voice type, color, animations, etc. Virtual friend server 230 may receive inputs from parent device 210 according to what type of virtual friend that parent device 210 would like for child wearable device 220.

Process 500 may include associating child device 220 with a virtual friend (block 520). For instance, virtual friend server 230 may logically associate a virtual friend, as defined based on the selections from parent device 210, with a particular child wearable device 220. In order to do so, virtual friend server 230 may receive identification information (e.g., an MDN) associated with child wearable device 220. In some implementations, parent device 210 may have already been associated with child wearable device 220 upon registration of parent device 210 and/or child wearable device 220 with virtual friend server 230.

Process 500 may include receiving configuration settings for virtual friend from parent device 210 (block 530). For example, virtual friend server 230 may receive settings information that identifies how, when, where, etc., the virtual friend will interact with the child of child wearable device 220. For instance, the settings information may include times, days, and geographic locations when the virtual friend will be available to the child. In another example, the settings information may specify a duration for which the child may interact with the virtual device and/or the manner in which the virtual friend will interact with the child (e.g., by appearing on a screen of child wearable device 220, by audio inputs/outputs only, etc.)

Process 500 may also include enabling the virtual friend for child wearable device 220 (block 540). For instance, virtual friend server 230 may cause the virtual friend to be downloaded to child wearable device 230. In some implementations, a notification may be sent to parent device 210 regarding the newly downloaded virtual friend. In some implementations, virtual friend server 230 may provide the configuration settings to child wearable device 220 so that the virtual friend appears and behaves in a manner that is consistent with the settings information received from parent device 210. Parent device 210 may add/edit/delete the configuration settings via virtual friend server 230 and/or by directly communicating with child wearable device 220, thereby modifying the appearance, behavior, and availability of the virtual friend.

Figure 6:
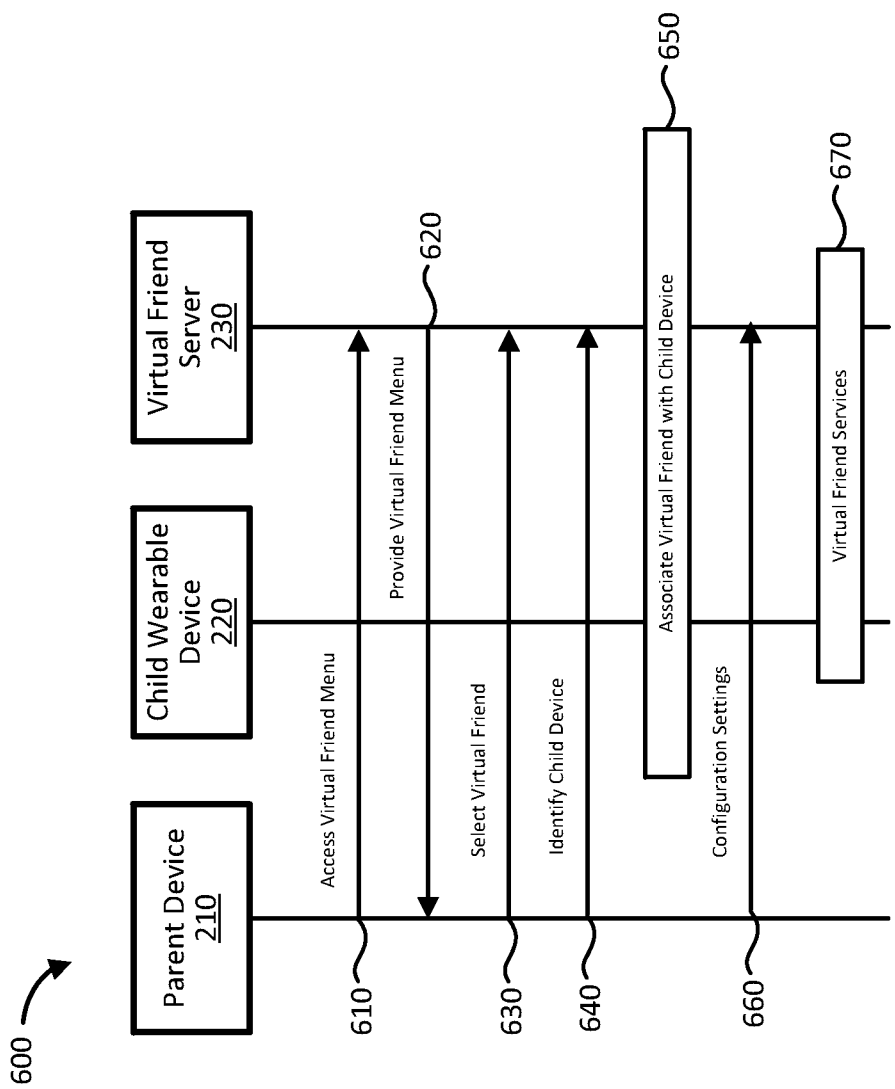
FIG. 6 is a sequence flow diagram illustrating an example process for installing a virtual friend on a child wearable device.

FIG. 6 is a sequence flow diagram illustrating an example process 600 for installing a virtual friend on a child wearable device 220. As shown, parent device 210, child device 220, and virtual friend server 230 may interact as part of process 600. Parent device 210 may belong to a parent or guardian of a child of child device 220.

As shown, parent device 210 may communicate a request to access a virtual friend menu from virtual friend server 230 (line 610). In response to the request, virtual friend server 230 may provide the virtual friend menu to parent device 210 (line 620) and parent device 210 may make one or more selections from the virtual friend menu (line 630). Selecting the virtual friend may include selecting a friend type (e.g., an animal, a superhero, a cartoon character, etc.) and one or more virtual friend traits (a voice type, a color, clothing, etc.) that can help customize the virtual friend. Parent device 210 may also identify child wearable device 220 (e.g., by providing an appropriate MDN) for which the virtual friend is intended (line 640). In some implementations, parent device 210 may have already been associated with child wearable device 220 upon registration of parent device 210 and/or child wearable device 220 with virtual friend server 230.

Virtual friend server 230 may associate the virtual friend with the child wearable device 220, which may include causing the virtual friend to be downloaded to child wearable device 220 (block 650). Parent device 210 may provide configuration settings to virtual friend server 230 in order to define the manner, times, location, etc., in which the virtual friend will be available and interact with the child of child wearable device 220 (line 660). Additionally, virtual friend server 230 may provide virtual friend services to child wearable device 220 in accordance with the configuration settings. In some implementations, this may include providing the actual configuration settings to child wearable device 220 to enable child wearable device 220 to implement the configuration settings locally.

Figure 7:
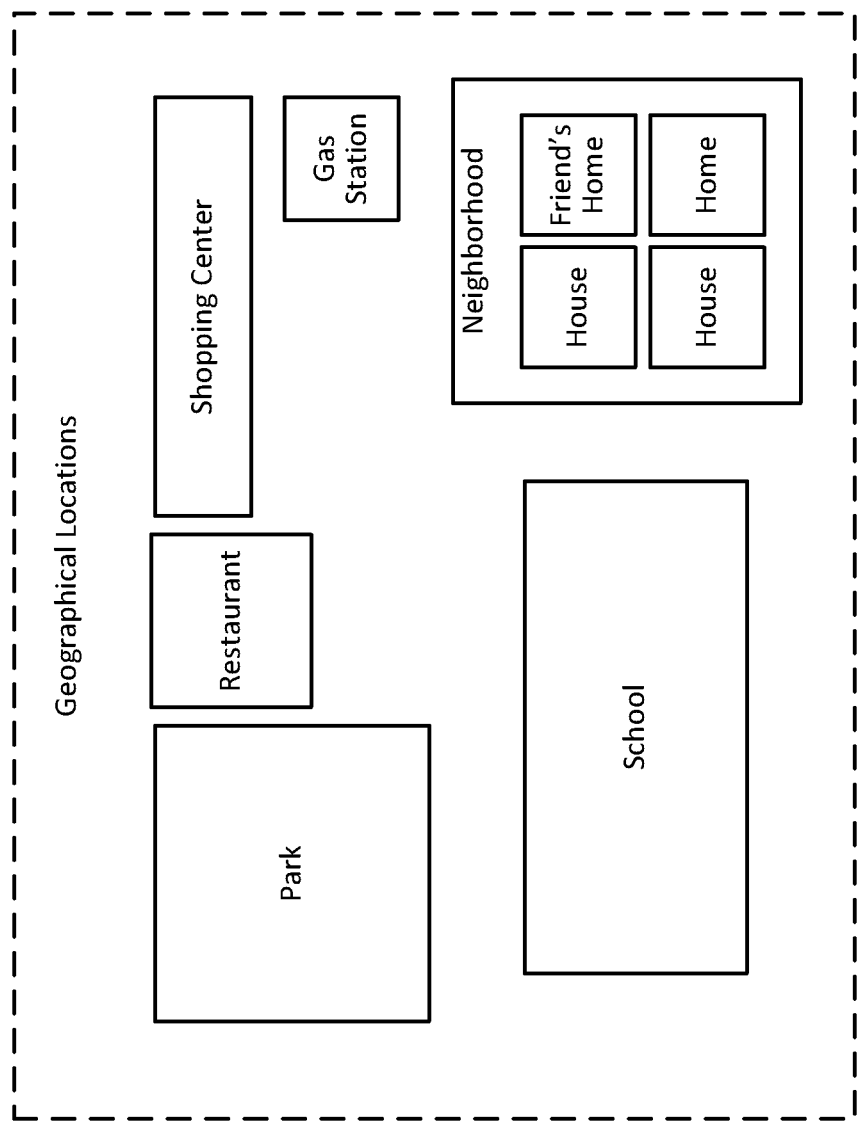
FIG. 7 is a diagram of example geographical locations that relate to virtual friend and social networking availability.

FIG. 7 is a diagram of example geographical locations that relate to virtual friend and social networking availability. As shown, the geographical locations may include a park, a restaurant, a shopping center, a gas station, a neighborhood (including several houses), and a school.

Child wearable device 220 may be setup to enable certain services at certain times and locations. For instance, a virtual friend may be generally available to a child when the child is at home, within a neighborhood, or at a friend's home. However, the virtual friend (and/or social networking) may not be available at the school while classes are in session (e.g., 9:00 AM to 3:00 PM on weekdays). Calling services may be available while the child is at the park, restaurant, shopping center, and gas station, but virtual friends and social networking services may not be available. As such, the availability of services provided by child wearable device 220 may depend on one or more factors, including the geographic location of the child wearable device 220, the time of day, and the day of the week. In some implementations, parent device 210 may be capable of dynamically changing the availability of services in real-time or performing certain functions, like a procedure to determine the current (or previous) geographic location of child wearable device 220.

Figure 8:
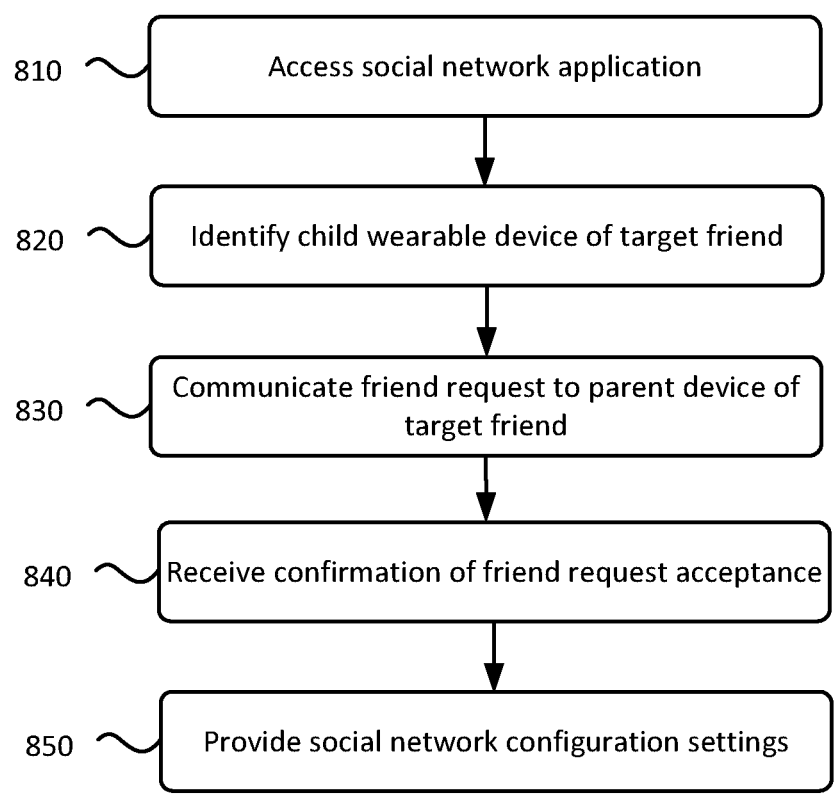
FIG. 8 is a flow chart illustrating an example process for connecting child wearable devices within a social network.

FIG. 8 is a flow chart illustrating an example process 800 for connecting child wearable devices 220 within a social network. Process 800 may be implemented by parent device 210. As some of the operations presented in FIG. 8 have been discussed above with reference to in the sequence flow diagram of FIG. 4, only a brief description of FIG. 8 is provided below.

As shown, process 800 may include accessing a social networking application (block 810). For instance, a parent of parent device 210 may access a software application installed on parent device 210 for accessing a social network. The software application may provide the parent with an interface for creating social network connections between child wearable devices 220 and controlling the activity of a child within the social network.

Process 800 may include identifying child wearable device 220 of a target friend (block 820). The target friend may include a child within the parent would like a make a social network connection with his or her own child. In some implementations, the parent may identify the child wearable device 220 of the target friend based on a mobile subscriber number, a name, a username, etc., of the child. In some implementations, the parent may identify the child wearable device 220 of the target friend based on a mobile subscriber number, a name, a username, etc., of a parent of the child.

Process 800 may include communicating a friend request to parent device 210 of the target friend (block 830). The invitation may include identification information of the parent device 210 sending the invitation, the child wearable device 220 corresponding to the parent device 210, the parent device 210 of the target friend, and the child wearable device 220 of the target friend. As such, the identification information may be displayed to the parent of the target friend so that it is clear who has sent the request and the child wearable devices 220 that would be involved in the new social network connection.

Process 800 may include receiving a confirmation of the friend request being accepted (block 840). For example, if/when the parent device 210 of the target friend has accepted the friend request, a confirmation of the friend request being accepted may be send to the parent device 210 that sent the friend request.

Process 800 may include providing social networking configuration settings (block 850). For example, a parent of parent device 210 may provide one or more configuration settings that dictate if, how, when, etc., that one child wearable device 220 may interact with another child wearable device 220 via the social network connection. As noted above, this may include defining times, dates, and locations where the social network services are available to child wearable device 220. Additionally, the configuration settings may include details regarding the content (e.g., pictures, music, videos, etc.) that may be shared and/or the manner in which the content may be shared (e.g., profile status updates, instant messaging services, etc.).

Figure 9:
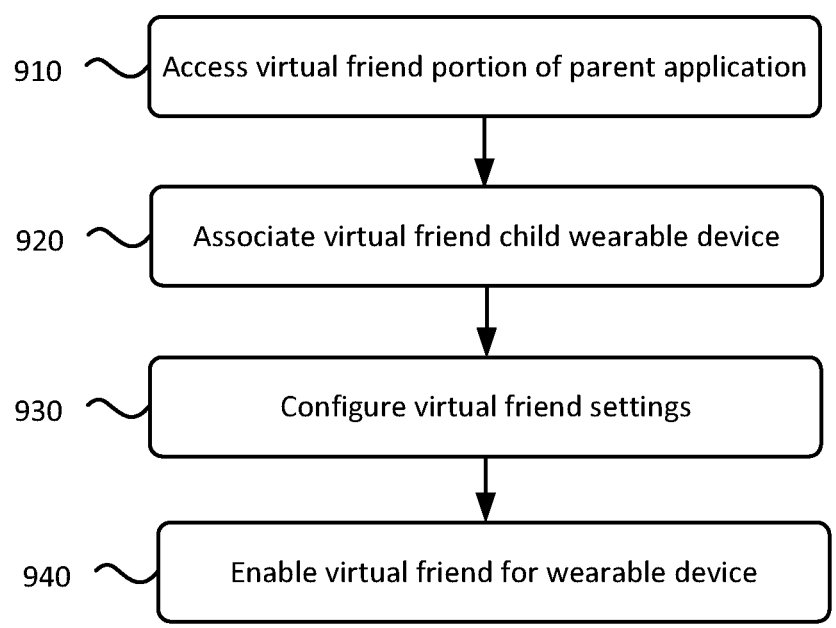
FIG. 9 is a flow chart illustrating an example process for installing a virtual friend on a child wearable device.

FIG. 9 is a flow chart illustrating an example process 900 for installing a virtual friend on child wearable device 220. Process 900 may be implemented by parent device 210. As some of the operations presented FIG. 9 have been discussed above with reference to in the sequence flow diagram of FIG. 6, only a brief description of FIG. 9 is provided below.

As shown, process 900 may include accessing a virtual friend portion of a parent application installed on parent device 210 (block 910). For instance, a parent may access virtual friend services, via virtual friend server 230, by accessing a software application installed on parent device 210. The software application may provide the parent with a menu of virtual friends and virtual friend characteristics from which to choose from.

Process 900 may include associating virtual friend with child wearable device 220 (block 920). For instance, parent device 210 may provide virtual friend server 230 with identification information of a child wearable device 220 for which a virtual friend has been selected or purchased. In some implementations, parent device 210 and child wearable device 220 may have already been associated with one another, from the perspective of virtual friend server 230 through, for example, an application registration process involving software of parent device 210 and/or child wearable device 220.

Process 900 may include providing configuration settings for the virtual friend (block 930). For example, parent device 210 may be used by a parent to provide virtual friend server 230 with configuration settings regarding how the virtual friend may act, what the virtual friend may look like or talk like, and when the virtual friend is available to the child of child wearable device 220. The configuration settings may be stored by virtual friend server 230 and/or sent to child wearable device 220.

Process 900 may include enabling the virtual friend for child wearable device 220 (block 940). For instance, parent device 210 may activate the virtual friend for child wearable device 220 once the virtual friend has been selected (e.g., purchased) and/or configured). In response to providing configuration settings to virtual friend server 230, the virtual friend may become available to child wearable device 220 in accordance with the configuration settings. In some implementations, parent device 210 may change and update configuration settings in order to control and manage the availability and nature of the virtual friend settings available via child wearable device 220.

Figure 10:
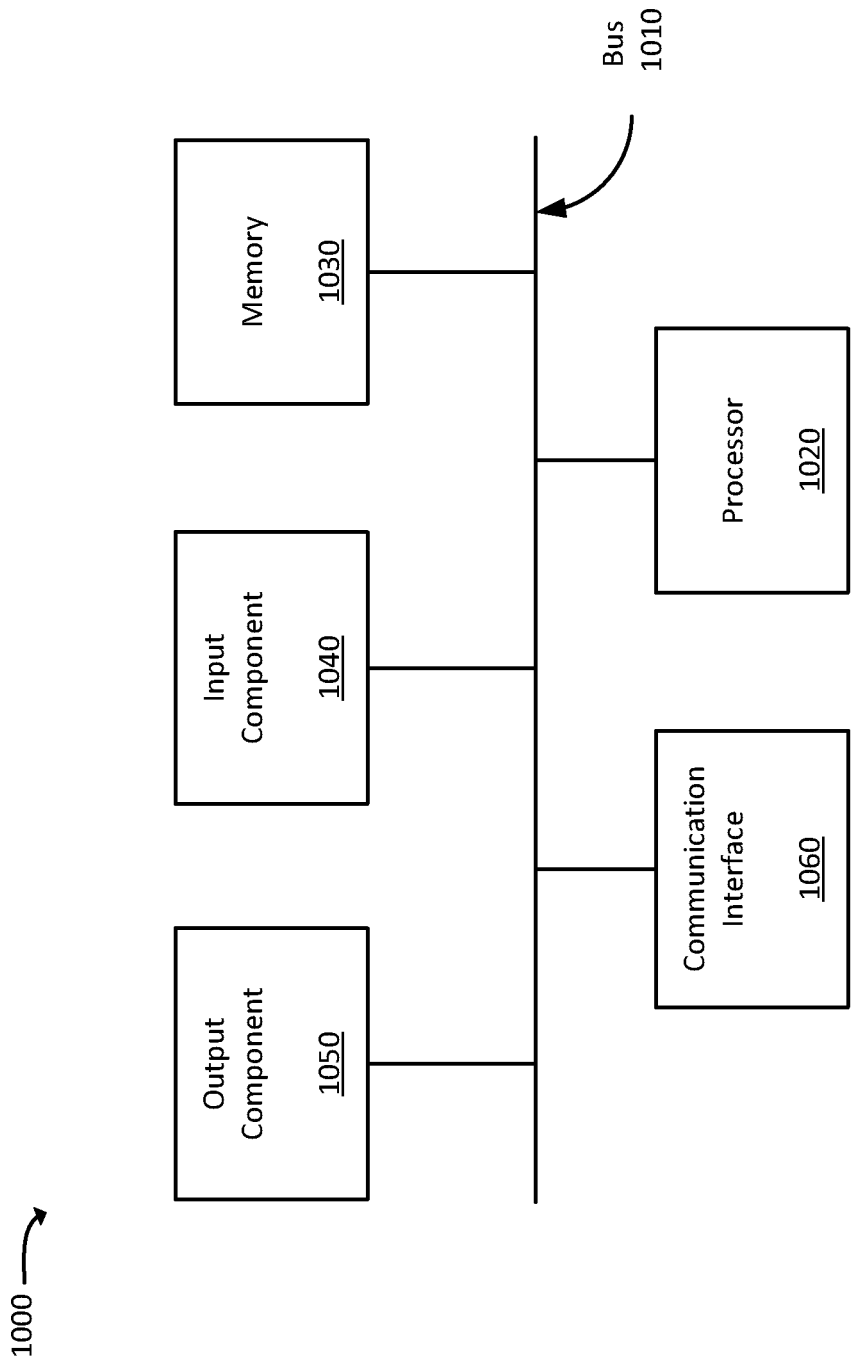
FIG. 10 is a diagram of example components of a device.

FIG. 10 is a diagram of example components of a device 1000. Each of the devices illustrated in FIGS. 1 and 2 may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes (LEDs), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with regard to FIGS. 3-6 and 8-9, the order of the blocks may be modified in other implementations. Further, non-dependent blocks may be performed in parallel. Similarly, while series of communications have been described with regard to FIGS. 1 and 2, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application-specific integrated circuit (ASIC) or a field-programmable gate array (FPGA), or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method performed by a server device, comprising:
    receiving, by the server device and from a first mobile computing device associated with a first child wearable device, a request to create a logical connection for social networking between the first child wearable device and a second child wearable device;
    sending, by the server device, the request to a second mobile computing device associated with the second child wearable device;
    receiving, by the server device, an acceptance of the request from the second mobile computing device;
    creating, by the server device and in response to the acceptance, the logical connection between the first child wearable device and the second child wearable device; and
    enabling, by the server device, social networking services between the first child wearable device and the second child wearable device.

2. The method of claim 1, further comprising:
    notifying the first mobile computing device and the second mobile computing device that the social networking services have been enabled for the first child wearable device and the second child wearable device.

3. The method of claim 1, further comprising:
    receiving configuration information, from at least one of the first mobile computing device and the second mobile computing device, for controlling the social networking services made available to at least one of the first child wearable device and the second child wearable device.

4. The method of claim 3, wherein the configuration information defines geographic locations where the social networking services are not available to the at least one of the first child wearable device and the second child wearable device.

5. The method of claim 3, wherein the configuration information defines a period of time when the social networking services are not available to the at least one of the first child wearable device and the second child wearable device.

6. The method of claim 3, wherein the configuration information defines a type of communication accessible, to the at least one of the first child wearable device and the second child wearable device, via the social networking services.

7. The method of claim 1, further comprising:
    notifying the first child wearable device and the second child wearable device that a friend request is pending;
    receiving an accept message, corresponding to the friend request, from each of the first child wearable device and the second child wearable device; and
    creating the logical connection between the first child wearable device and the second child wearable device in response to the accept message from each of the first child wearable device and the second child wearable device.

8. The method of claim 1, further comprising:
    receiving, from the first mobile computing device, a request to provide a virtual friend to the first child wearable device;
    receiving, from the first mobile computing device, information defining the virtual friend; and
    enabling the first child wearable device to download the virtual friend.

9. The method of claim 8, further comprising:
    receiving configuration information, from the first mobile computing device, regarding the virtual friend; and
    providing virtual friend services to the first child wearable device in accordance with the configuration information regarding the virtual friend.

10. A server device comprising:
    a non-transitory memory device storing a plurality of processor-executable instructions; and
    a processor configured to execute the processor-executable instructions, wherein executing the processor-executable instructions causes the processor to:
        receive, from a first mobile computing device associated with a first child wearable device, a request to create a logical connection for social networking between the first child wearable device and a second child wearable device;
        send the request to a second mobile computing device associated with the second child wearable device;
        receive an acceptance of the request from the second mobile computing device;
        create, in response to the acceptance, the logical connection between the first child wearable device and the second child wearable device; and
        enable social networking services between the first child wearable device and the second child wearable device.

11. The server device of claim 10, wherein the processor-executable instructions causes the processor further to:
    notify the first mobile computing device and the second mobile computing device that the social networking services have been enabled for the first child wearable device and the second child wearable device.

12. The server device of claim 10, wherein the processor-executable instructions causes the processor further to:
    receive configuration information, from at least one of the first mobile computing device and the second mobile computing device, for controlling the social networking services made available to at least one of the first child wearable device and the second child wearable device.

13. The server device of claim 12, wherein the configuration information defines geographic locations where the social networking services are not available to the at least one of the first child wearable device and the second child wearable device.

14. The server device of claim 10, wherein the processor-executable instructions causes the processor further to:
notify the first child wearable device and the second child wearable device that a friend request is pending;
receive an accept message, corresponding to the friend request, from each of the first child wearable device and the second child wearable device; and
create the logical connection between the first child wearable device and the second child wearable device in response to the accept message from each of the first child wearable device and the second child wearable device.

15. The server device of claim 10, wherein the processor-executable instructions causes the processor further to:
receive, from the first mobile computing device, a request to provide a virtual friend to the first child wearable device;
receive, from the first mobile computing device, information defining the virtual friend; and
enable the first child wearable device to download the virtual friend.

16. The server device of claim 10, wherein the processor-executable instructions causes the processor further to:
receive configuration information, from the first mobile computing device, regarding the virtual friend; and
provide virtual friend services to the first child wearable device in accordance with the configuration information regarding the virtual friend.

17. A non-transitory computer readable medium storing a plurality of processor-executable instructions, wherein executing the processor-executable instructions causes one or more processors to:
receive, from a first mobile computing device associated with a first child wearable device, a request to create a logical connection for social networking between the first child wearable device and a second child wearable device;
send the request to a second mobile computing device associated with the second child wearable device;
receive an acceptance of the request from the second mobile computing device;
create, in response to the acceptance, the logical connection between the first child wearable device and the second child wearable device; and
enable social networking services between the first child wearable device and the second child wearable device.

18. The non-transitory computer readable medium of claim 17, wherein the processor-executable instructions causes the one or more processors further to:
notify the first mobile computing device and the second mobile computing device that the social networking services have been enabled for the first child wearable device and the second child wearable device.

19. The non-transitory computer readable medium of claim 17, wherein the processor-executable instructions causes the one or more processors further to:
receive configuration information, from at least one of the first mobile computing device and the second mobile computing device, for controlling the social networking services made available to at least one of the first child wearable device and the second child wearable device.

20. The non-transitory computer readable medium of claim 17, wherein the processor-executable instructions causes the one or more processors further to:
notify the first child wearable device and the second child wearable device that a friend request is pending;
receive an accept message, corresponding to the friend request, from each of the first child wearable device and the second child wearable device; and
create the logical connection between the first child wearable device and the second child wearable device in response to the accept message from each of the first child wearable device and the second child wearable device.

* * * * *